United States Patent [19]
Contarino, Jr.

[11] Patent Number: 6,094,261
[45] Date of Patent: Jul. 25, 2000

[54] METHOD AND APPARATUS FOR DISTINGUISHING FIBER-OPTIC CABLES

[75] Inventor: Alfred F. Contarino, Jr., Andover, Mass.

[73] Assignee: L-Com, Inc., North Andover, Mass.

[21] Appl. No.: 09/015,829

[22] Filed: Jan. 29, 1998

[51] Int. Cl.$^7$ .............................. G01N 21/00; G01B 9/10
[52] U.S. Cl. ...................... 356/73.1; 250/227.31
[58] Field of Search .................. 356/73.1; 250/44, 250/227; 385/35

[56] References Cited

U.S. PATENT DOCUMENTS

| | | | |
|---|---|---|---|
| 3,884,585 | 5/1975 | Lebduska | 356/239 |
| 4,288,161 | 9/1981 | Fortescue | 356/73 |
| 4,445,086 | 4/1984 | Bulatao | 324/66 |
| 4,671,629 | 6/1987 | Doyle | 350/523 |
| 4,671,653 | 6/1987 | So et al. | 356/73.1 |
| 4,672,198 | 6/1987 | Presby | 250/227 |
| 4,797,556 | 1/1989 | Marzari et al. | 250/551 |
| 4,800,265 | 1/1989 | Marzari et al. | 356/73.1 |
| 4,812,743 | 3/1989 | Morrison | 324/77 R |
| 4,840,482 | 6/1989 | Shigematsu et al. | 356/73.1 |
| 4,870,269 | 9/1989 | Jeunhomme et al. | 250/227 |
| 4,940,892 | 7/1990 | Fisher et al. | 250/227.24 |
| 4,981,333 | 1/1991 | Hayes | 350/96.2 |
| 5,090,018 | 2/1992 | Murphy et al. | 356/44 |
| 5,196,899 | 3/1993 | Serwatka | 356/73.1 |
| 5,329,348 | 7/1994 | Nimura et al. | 356/73.1 |
| 5,463,707 | 10/1995 | Nakata et al. | 385/35 |
| 5,521,701 | 5/1996 | Felger et al. | 356/218 |
| 5,570,176 | 10/1996 | Noel | 356/73.1 |
| 5,612,780 | 3/1997 | Rickenbach et al. | 356/73.1 |

*Primary Examiner*—Frank G. Font
*Assistant Examiner*—Roy M. Punnoose
*Attorney, Agent, or Firm*—Synnestvedt & Lechner LLP

[57] ABSTRACT

A method and apparatus for distinguishing various fiber-optic cables from each other in an installation where cables are grouped together, the apparatus comprising a light source for generating a high-intensity, reasonably highly collated, colored, and pulsed light beam. The light is coupled into one end of a fiber-optic cable, whereby an installer can easily observe the corresponding light coming out of the opposite end of the cable to distinguish that cable from the other cables.

8 Claims, 4 Drawing Sheets

METHOD AND APPARATUS FOR DISTINGUISHING FIBER-OPTIC CABLES

FIELD OF THE INVENTION

The invention pertains to a method and apparatus for distinguishing one fiber-optic cable from another when multiple cable termination points are grouped together.

BACKGROUND OF THE INVENTION

The use of fiber-optic cables to transmit digital data in local area networks, such as in office buildings is becoming increasingly more common. Some of the reasons for this phenomenon are the superior band width and superior transmission qualities of fiber-optic cables as compared to electrical wires made of copper or aluminum. In many installations, a plurality of cables are run to the same location. For example, in an office building, one end of a fiber-optic cable commonly terminates in a wiring closet along with possibly hundreds of other similar fiber-optic cables. The cables are run through the ceilings and walls of the building to various other termination points in the building, such as offices, cubicles, secretarial stations, or data stations elsewhere in the building. Even at these types of locations, there may be many fiber-optic cable ends for connection to office and data equipment. In most situations, most, if not all, of the cables will be essentially identical to each other in appearance. Accordingly, after the cables have been run from one or more locations to the same termination location, it is difficult for the installer of the cables to easily determine which of the many cables terminating at one location, corresponds to a particular cable end in the wiring closet. Accordingly, it is frequently necessary to input a light signal at one end of a cable and observe the ends of many cables to detect the light coming out of the other end of the cable in order to determine which cable termination point corresponds to which cable origination point.

Most commonly, to trace a fiber-optic cable run, an installer utilizes an ordinary flashlight with a specially designed adaptor for connecting to fiber-optic cable termination connectors. Particularly, he couples the flashlight to one end of the fiber-optic cable and then looks for the light coming out of the other end of the cable. This method of distinguishing fiber-optic cables from each other can be extremely difficult for several reasons. First, the incandescent, white, light generated by an ordinary flashlight is not particularly well focused or of particularly strong intensity. Further, the magnitude of the light is constant in time. Accordingly, it is sometimes very difficult to detect with the naked eye the light coming out of the opposite end of the cable because it is weak and of the same color as the ambient light in the room. Further, the cladding for many types of fiber-optic cables as well as the ferrule of most fiber optic connectors are white, i.e., the same color as the light, thus making it even more difficult to detect.

Many systems are known in the prior art for detecting a light input at one end of a fiber-optic cable at the opposite end of the fiber-optic cable. However, most of these systems are complex systems including both transmitting equipment and receiving equipment for, not only detecting the light, but also determining other properties of the cable. While these types of systems may be well adapted for certain applications, they are generally impractical, overly expensive, and overly complicated for the simple task of running cable through a building and distinguishing the various identical looking cables from each other.

U.S. Pat. No. 4,797,556 issued to Marzari et al. (hereinafter Marzari) discloses one such complex optical continuity testing apparatus comprising equipment for transmitting infrared test light pulses down a fiber-optic cable and separate receiving equipment for detecting the pulses at the opposite end. However, the light pulses are infrared and, therefore, are not detectable by the naked eye, but only by specifically designed receiving end equipment which then generates a visual and/or audible signal indicative of the power of the received light.

U.S. Pat. No. 4,870,269 issued to Jeunhomme (hereinafter Jeunhomme) discloses an optical fiber testing device using a pulsed laser diode. Again, this device is not designed for detection of the pulsed light by the human eye, but rather by specially designed detection equipment. In fact, the light transmitted down the cable under test is reflected back by "sensor" equipment positioned at the opposite end of the cable, and detected at the same end from which it was transmitted. Accordingly, this device assumes that the identity of the opposite ends of the cable is already known. Further, since it uses a laser diode to generate the transmitted light, it would be inadvisable to use the naked eye to detect the light output at the opposite end since it might be harmful.

U.S. Pat. No. 5,329,348 issued to Nimura (hereinafter Nimura) discloses a method for identifying a specific fiber-optic cable out of a number of similar optical cables. This patent pertains primarily to detecting fluctuations in the light transmissive qualities of the cable due to physical agitation of the cable at a point intermediate its two ends. Accordingly, this device is not designed nor practical for tracing cables at a construction site.

Therefore, it is an object of the present invention to provide an improved method and apparatus for tracing fiber-optic cables.

It is another object of the present invention to provide an inexpensive and simple method and apparatus for tracing fiber-optic cables.

It is a further object of the present invention to provide a method and apparatus for tracing cables using light signals that are easily detectable by the naked eye.

SUMMARY OF THE INVENTION

The invention is a method and apparatus for distinguishing various fiber-optic cables from each other during and after an installation. It includes a fiber-optic light source that creates a high-intensity, colored, pulsed, light beam. Preferably, the light beam is also reasonably highly collated, but not to the extent of a laser light source. Since the light is colored, it is more easily visible when it exits the opposite end of the cable. Further, because it is high-intensity, and highly collated, it also is more easily detectable by the naked eye at the opposite end of the cable. Finally, the fact that the beam is pulsed makes it more easily detectable, since it is easier for the naked eye to detect the on/off pulses of a light source as opposed to a steady state on or off condition.

DETAILED DESCRIPTION OF A PREFERRED EMBODIMENT OF THE INVENTION

Figure 1:
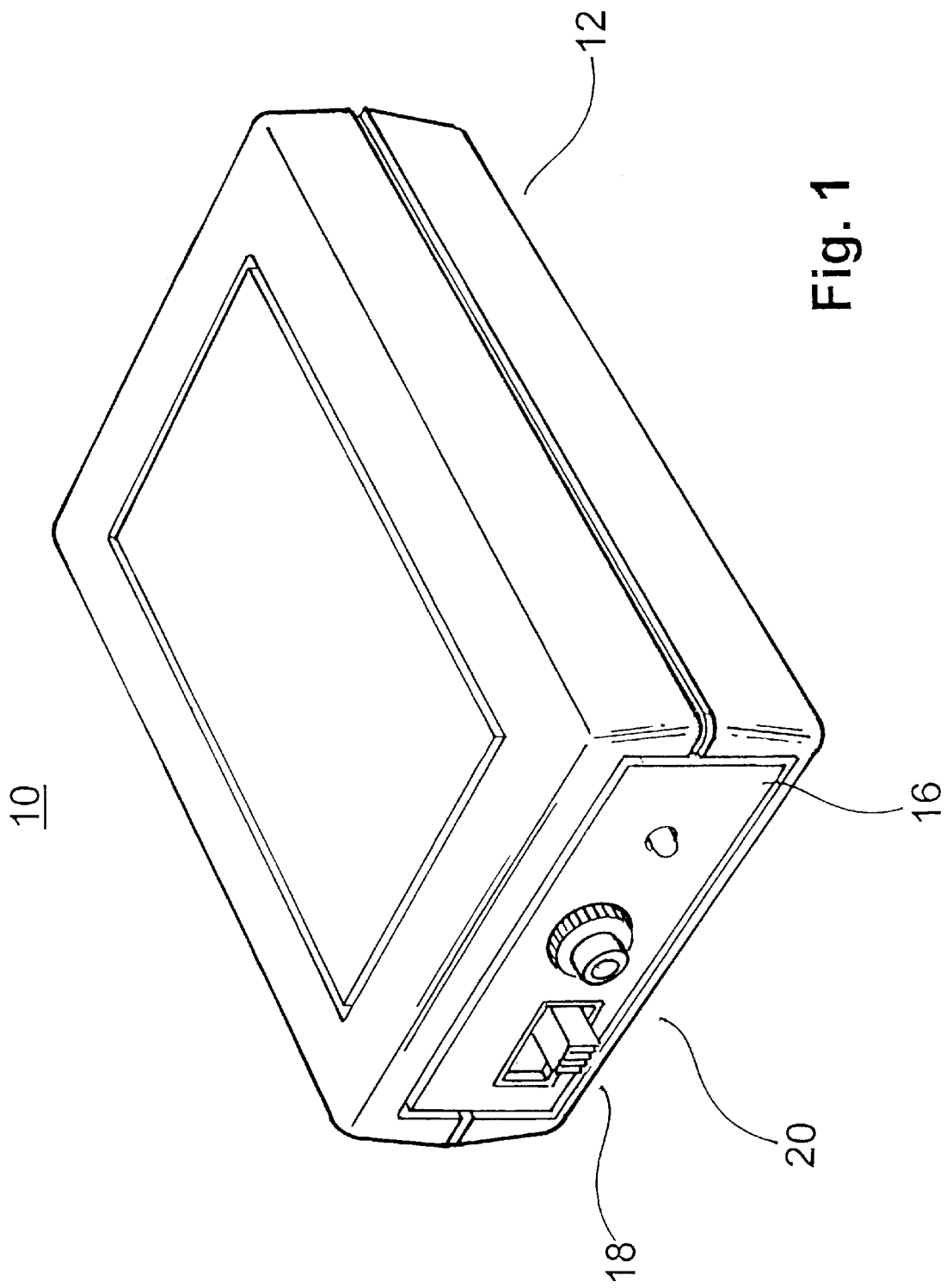
FIG. 1 is a perspective view of a tool in accordance with the present invention.
Figure 2:
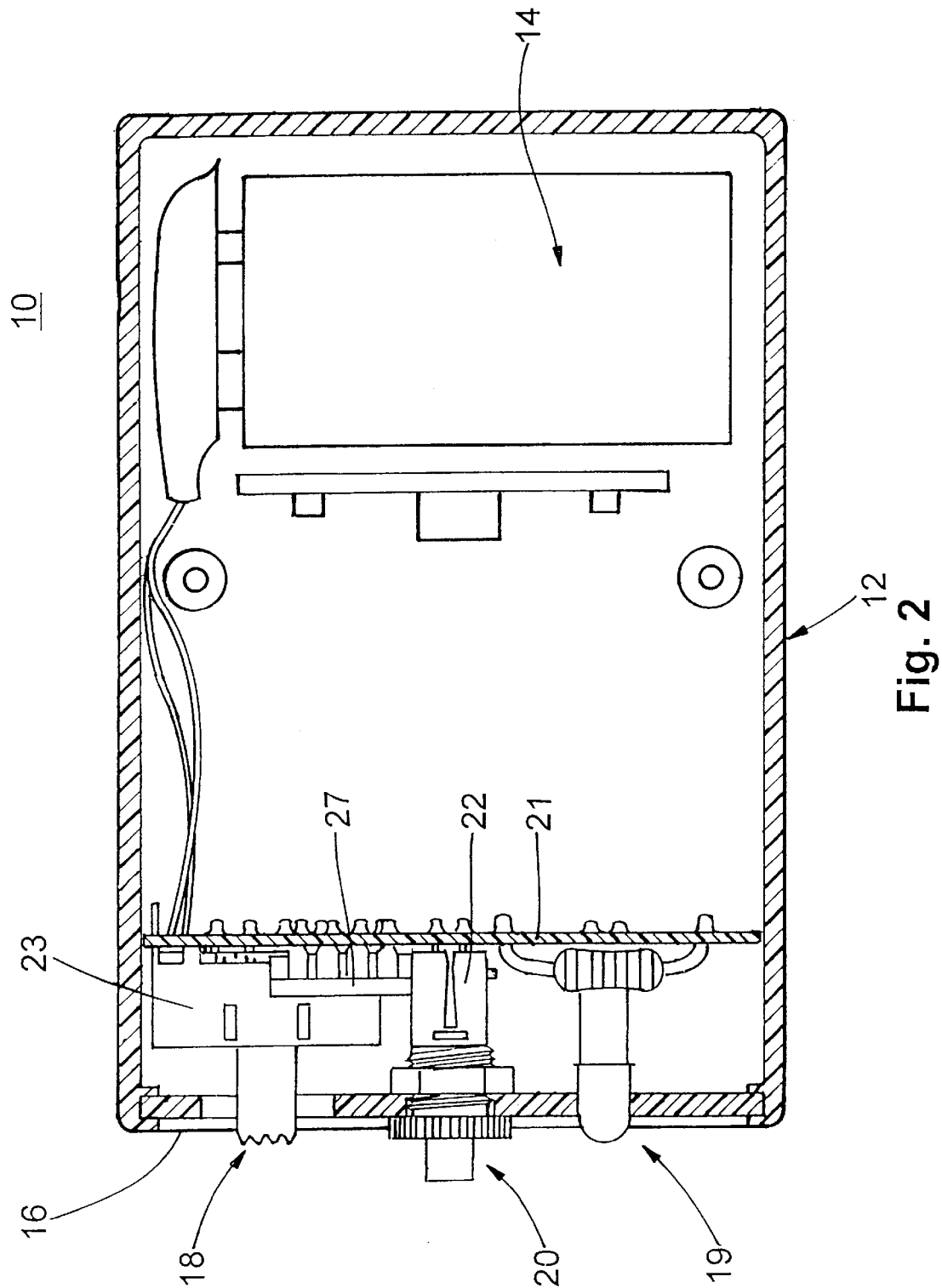
FIG. 2 is a cross-sectional view of a tool in accordance with the present invention.

Referring to FIGS. 1 and 2, the tool 10 in accordance with the present invention is a hand-held, pocket-sized light source. The device includes an enclosure 12 within which a battery 14 for providing power to drive the light source 22 may be contained. Positioned on the front panel 16 is a manually operable switch 18 for turning the tool 10 on and off and selecting between two modes of operation, namely steady state and pulsed. In the pulsed mode, the light source 22 generates a pulsed light beam at a 50% duty cycle at a rate of about 3–5 hertz. In the steady-state mode, the light source 22 generates a steady beam.

An adaptor mechanism 20 housing the light source 22 appears on plate 16. The adaptor mechanism 20 is designed to accept one or more of the standard type fiber-optic cable end couplers used in most installations, including ST, SC, FC, FDDI (FDS), and ESCON (RSD).

The light source 22 may be a high-intensity incandescent light bulb in a colored glass shade. However, preferably, the light source 22 is a high-intensity LED which generates a beam of a particular color which is easily distinguishable from ambient light. LEDs are commonly available on the market in colors such as green, red, blue, and orange. Such LEDs are particularly desirable because they are low power, generate highly intense, relatively highly collated beams and have relatively instant on/off characteristics such that they can be pulsed at a high rate without loss of intensity. The light generated by the light source 22 exits the tool 10 through coupler 20 and into the cable (not shown). A lens may be included in the coupler 20 to help direct the light into a narrowly focused beam directed into the cable. A second LED 19 is an indicator LED that indicates whether the tool 10 is on, and, if so, the present mode of operation. As described in further detail below, the indicator LED 19 preferably is coupled in series with the light source LED 22 such that, when the tool 10 is in the pulsed mode, the indicator LED 19 pulses in unison with the light source LED 22 and, when the tool is in the steady-state mode, the light source LED 22 and the indicator LED 19 are both steady on. Accordingly, the condition of the indicator LED discloses the mode of the unit. When the light source LED 22 is off, the indicator LED 19 is, of course, also off.

The enclosure 12 encloses a printed circuit board 21 upon which is mounted the LED 22, the indicator LED 19, a switch circuit 23 (including manual switch 18), and a pulser circuit 27.

Figure 3:
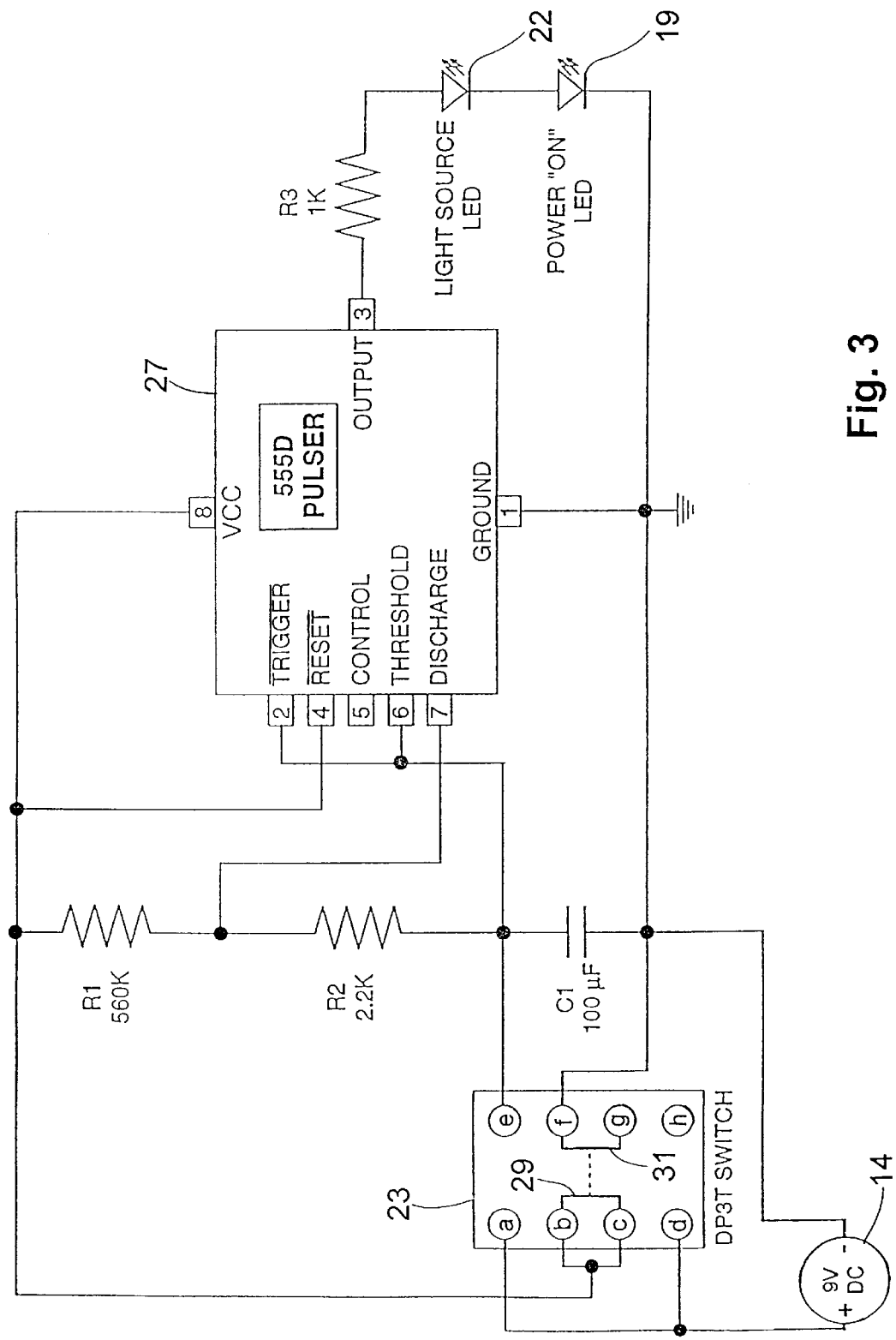
FIG. 3 is a block circuit diagram of a tool in accordance with the present invention.

FIG. 3 is a circuit diagram illustrating in greater detail the basic electrical components of the tool in accordance with the present invention, e.g., battery 14, LEDs 19 and 22, integrated circuit 23 and 27, and associated circuit elements. Particularly, a power source such as battery 14 is provided. In a preferred embodiment of the invention, the battery is a long-lasting 9 volt NiCad battery. However, the battery 14 also may comprise one or more standard household batteries of any reasonable size such as AAA, AA, C, D. Switch circuit 23 is a slide switch which may be a SS039-P023BA (2P3T) switch manufactured by T-MEC of Taiwan. Pulser circuit 27 is a precision timer capable of generating a pulsed output signal. The ICM7555 manufactured by Harris Semiconductor is one such general purpose precision timer that may be used.

The current generated by the battery is provided to one terminal of switch circuit 23, which is a three position switch. The right and left sides of the switch are mechanically coupled such that jumper 31 moves in unison with manually operated jumper 29. Each of the jumpers connect two adjacent terminals of the switch circuit 23. The switch is shown in FIG. 3 in the middle position, in which terminals b and c on the left side of the switch are coupled by jumper 29 and terminals f and g on the right side are coupled together by jumper 31. In this position the tool is off. Particularly, as can be seen in FIG. 3, terminals a and d are coupled to the positive side of the battery 14, while neither of terminals b or c are coupled thereto. Thus, in the middle position, no power is provided to the circuit.

In the upper position, i.e., with jumper 29 connecting terminals a and b and jumper 31 connecting terminals e and f, the tool will be in the steady-state mode. Particularly, power will be supplied from the battery to the $V_{cc}$ rail via terminals a and b in order to provide power to timer circuit 27. Further jumper 31 will be coupled across switch circuit terminals e and f, thus shorting out capacitor C1. As can be seen in the Figure, in this configuration, RESET is held high (no RESET) while the trigger and threshold terminals of pulser circuit 27 are tied to ground. Thus, the voltage into the discharge terminal of pulser circuit 27 will be constant at a voltage level between $V_{cc}$ and ground dictated by the voltage divider formed by resistors R1 and R2. The values of resistors R1 and R2 are selected to prevent discharge of the pulser. In this configuration, the Harris Semiconductor ICM7555 pulser generates a constant current at its output terminal, thus causing both light source LED 22 and indicator LED 19 to glow steadily.

In the lower position, i.e., jumper 29 connecting terminals c and d and jumper 31 connecting terminals g and h, the Harris Semiconductor ICM7555 timer 27 will be set up as an astable multivibrator thus causing the tool to operate in the pulsed mode. Particularly, power will be supplied from the battery via terminals c and d to the $V_{cc}$ rail to power the pulser circuit 27. Further jumper 31 will be coupled across switch circuit terminals g and h. Thus the threshold and trigger terminals of timer 27 will be coupled to ground through capacitor C1. In this configuration, reset is still held high (no RESET) and the timer will operate as an astable multivibrator. As current pours into capacitor C1, the voltage presented to the trigger, threshold and discharge terminals will rise until the timer is triggered causing the output to turn off, thus turning off the LEDs 19 and 22. When the output turns off, the capacitor C1 will discharge through the discharge terminal timer 27 until the voltage across capacitor C1 drops low enough to cause the threshold and trigger voltages to turn the output back on, thus causing the capacitor C1 to start charging again. This process runs continuously (an astable multivibrator) while the switch is in the lower position.

While, the pulse generator may be adjustable and the tool 10 may include a dial or other means for controlling the rate and/or duty cycle of the pulse generator, such is believed to be unnecessary. In the preferred embodiment of the invention, the light source is pulsed on and off at a 50% duty cycle at a rate of between 1 and 10 hertz and more preferably at a rate of between 3 and 6 hertz. This simple design will keep manufacturing complexity and cost down without any significant loss in functionality, since a single, appropriately selected, duty cycle and pulse rate is likely to be easily visually distinguishable in almost any normally encountered ambient light situation.

Figure 4:
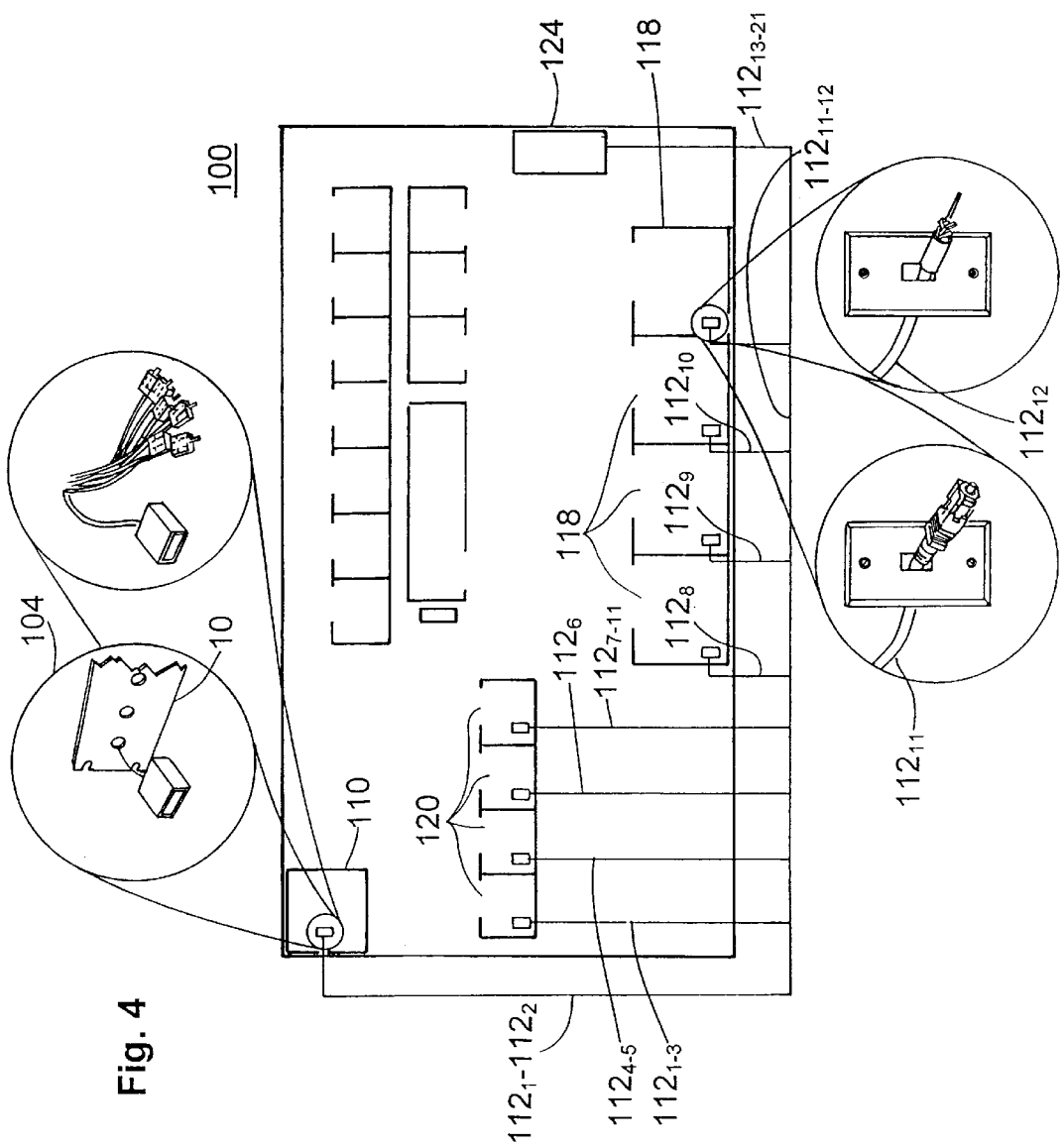
FIG. 4 is a partially pictorial, partially schematic diagram of a fiber-optic cable installation in a building utilizing the present invention.

FIG. 4 illustrates the use of the present invention in the exemplary environment of an office building. A wiring closet 110 is shown in an office building 100. A plurality of fiber-optic cables $112_1$–$112_{21}$ terminate at one or more junction boxes or patch panels 104 in the closet 110. It would not be unusual for the number of fiber-optic cables terminating in a wiring closet in an office building to exceed 100 cables. Cables are routed through the walls and ceilings of the building 100 to various termination points such as individual offices 118, secretarial stations or cubicles 120 and other equipment closets 124. At many locations, particularly equipment closets and other wiring closets, many fiber-optic cables may terminate which originated either at wiring closet 110 or other locations. During installation when two or more cables share the same route in a wall or ceiling, the installer typically will bundle the cables together with cable ties 130 at regular intervals, e.g., every 5 feet, for the length of their shared route. Cables may share the same route for any span of their entire lengths. For instance, cables may 1) share the same route for their entire length (e.g., cables $112_{7-11}$ or 2) may start at the same location, share the same route for a span and then split off (e.g., cables $112_8$ and $112_9$, or 3) may share the same route only for an intermediate span (not shown). Accordingly, at termination points, a group of several fiber-optic cables may exit from the wall bundled together in a group. Since, in many cases, all of the cables are essentially identical in appearance, it is difficult to ascertain the origination points of the various cables.

Accordingly, the installer can return to the origination end of a cable, unhook it from the junction box and couple it to the tool 10 of the present invention. The installer can then turn the tool 10 on in the pulsed mode so that it begins to emit into the cable, the colored, pulsed, high-intensity, light beam heretofore described. The installer can then return to the location or locations where he or she believes that cable may terminate and observe with the naked eye which of the many possible cables is emitting a pulsed, colored, light beam at the same frequency and color of the light source 22. The process can be repeated for as many cables as necessary.

The tool of the present invention is extremely lightweight, inexpensive to manufacture and simple to use. It does not require any receiving end equipment other than the naked eye.

Having thus described a few particular embodiments of the invention, various other alterations, modifications, and improvements will readily occur to those skilled in the art. Such alterations, modifications and improvements as are made obvious by this disclosure are intended to be part of this description though not expressly stated herein, and are intended to be within the spirit and scope of the invention.

The foregoing description is by way of example only, and not limiting. The invention is limited only as defined in the following claims and equivalents thereto.

What is claimed is:

1. An apparatus for tracing optical cables comprising:
    a light source for generating pulsed light within the visible spectrum and of a color easily distinguishable from white light said light source net generating laser light;
    an optical coupler disposed adjacent said light source for coupling said light generated by said light source into an optical cable via a mating optical coupler at one end of said cable; and
    a lens associated with said coupler for focusing said light into said cable.

2. An apparatus as set forth in claim 1 wherein said light source is a light emitting diode.

3. A apparatus as set forth in claim 2 wherein said frequency is in the range of 1 Hz to 10 Hz.

4. An apparatus as set forth in claim 3 wherein said frequency is in the range of 3 Hz to 6 Hz.

5. An apparatus as set forth in claim 1 wherein said cable is a fiber-optic cable.

6. A method of tracing optical cables in an environment comprising the steps of:
    generating a pulsed light beam within the visible spectrum, and not comprising laser light and of a color easily distinguishable from white light of a color easily distinguishable by the naked eye from ambient light in said environment;
    directing said light into a focusing lens;
    coupling said light from said lens into a first end of an optical cable; and
    observing with the naked eye an open end of at least one cable to detect light emitted therefrom that matches said generated light.

7. A method as set forth in claim 6 wherein said frequency is in the range of 1 Hz to 10 Hz.

8. A method as set forth in claim 6 wherein said frequency is in the range of 3 Hz to 6 Hz.

* * * * *